(12) United States Patent
Valero

(10) Patent No.: US 6,802,580 B2
(45) Date of Patent: Oct. 12, 2004

(54) PRINTER DEVICE AND METHOD

(75) Inventor: Jose Luis Valero, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/353,851

(22) Filed: Jan. 28, 2003

(65) Prior Publication Data
US 2003/0218650 A1 Nov. 27, 2003

(30) Foreign Application Priority Data
Jan. 30, 2002 (GB) .............................. 0202099

(51) Int. Cl.⁷ ................................................ B41J 2/01
(52) U.S. Cl. ......................................... 347/1; 347/104
(58) Field of Search ............................. 347/1, 13, 14, 347/104, 42, 3; 399/72

(56) References Cited

U.S. PATENT DOCUMENTS

| 4,683,481 A | 7/1987 | Johnson | 347/65 |
| 5,278,584 A | 1/1994 | Keefe et al. | 347/63 |
| 5,614,930 A | 3/1997 | Osborne et al. | 347/33 |
| 5,659,342 A | 8/1997 | Lund et al. | 347/35 |
| 6,037,584 A | 3/2000 | Johnson et al. | 250/235 |
| 6,196,652 B1 | 3/2001 | Subirada et al. | 347/19 |
| 6,606,165 B1 * | 8/2003 | Barry et al. | 358/1.9 |

FOREIGN PATENT DOCUMENTS

| EP | 0 863 004 A2 | 9/1998 |
| EP | 0 863 012 A1 | 9/1998 |
| EP | 0 677 388 B1 | 10/2001 |
| EP | 1 033 251 B1 | 5/2003 |

* cited by examiner

Primary Examiner—Stephen D. Meier
Assistant Examiner—Alfred Dudding

(57) ABSTRACT

A printer apparatus comprising one or more printing elements arranged to print on print media in a print zone and a transport path arranged to transport printed sheets from the print zone to an output position, the apparatus further comprising a scanner arranged to scan a printed sheet, and diverting means arranged to selectively divert a printed sheet to the scanner, the scanner being located such that the apparatus may continue to print and transport sheets to the output position during the scanning process.

36 Claims, 5 Drawing Sheets

PRINTER DEVICE AND METHOD

FIELD OF THE INVENTION

The present invention relates to printer devices, and particularly, although not exclusively, to a method and apparatus for servicing printing nozzles in page wide array ink jet devices.

BACKGROUND TO THE INVENTION

As is well known in the art, conventional inkjet printers generally employ one or more inkjet cartridges, often called "pens", which shoot drops of ink onto a page or sheet of print media. For instance, two earlier thermal ink ejection mechanisms are shown in U.S. Pat. Nos. 5,278,584 and 4,683,481, both assigned to the present assignee, Hewlett-Packard Company. The pens are usually mounted on a carriage, which is arranged to scan across a scan axis relative to a sheet of print media as the pens print a series of individual drops of ink on the print media. The series of drops collectively form a band or "swath" of an image, such as a picture, chart or text. Between scans, the print medium is advanced relative to the scan axis. In this manner, an image may be incrementally printed.

A continuing goal of inkjet printing technology is to increase the speed (i.e. reduce the time) with which an image may be printed. Various factors limit the speed with which an image may be printed. Amongst these factors is the time that the printhead carriage requires to scan across the print media. This time is especially important in unidirectional print modes, which are usually used to achieve high print quality. In unidirectional print modes, ink is printed only whilst the carriage is moving in one direction along the scan axis. Thus, for every printed swath, a non-printing return movement of the carriage along the scan axis is required.

One known method of avoiding this limitation is to use a page wide array (PWA) of printheads. In PWA printers, an array of printheads extending across the width of the page is used. Thus, ink may be ejected across the entire printable width of the print media, without moving the printheads across the width of the page. Generally, the print medium is then fed in a direction perpendicular to the array of printheads while the array of printheads is maintained stationary. In this manner, such scanning times may be eliminated.

In order to maintain the quality of the printed output of the printer device, it is important that each instruction to the print head to produce an ink drop from a given nozzle does indeed produce such an ink drop. Thus, it is important to verify that each nozzle is functioning correctly.

Optical drop detection systems are known, such as are used in the Hewlett-Packard DesignJet 1050 and Hewlett-Packard DesignJet 5000. In such systems, the printheads are periodically moved to a position above an optical drop detector, which situated outside of the print zone. One by one, the nozzles of a given printhead are controlled to eject ink drops through the light beam of the optical detector. If no ink drop is detected, the nozzle concerned may be assumed to be malfunctioning and appropriate maintenance routines may be implemented.

Such drop detection systems, although effective, suffers from the drawback that the drop detection procedure is time intensive and that while the procedure is being carried out, it is not possible to print. In the case of PWA printers such a procedure is not generally practicable. This is because the large numbers of nozzles in the page wide printhead arrays will require even longer to test than the printheads of conventional scanning printers, such as the Hewlett-Packard DesignJet 1050. Furthermore, however, since PWA inkjet printers aim to provide increased throughput, relative to conventional scanning inkjet printers, they are less tolerant to printing downtime.

It would therefore be desirable to provide an improved system and method for drop detection.

SUMMARY OF THE INVENTION

According to the present invention there is provided a printer apparatus comprising one or more printing elements arranged to print on print media in a print zone and a transport path arranged to transport printed sheets from the print zone to an output position, the apparatus further comprising a scanner arranged to scan a printed sheet, and diverting means arranged to selectively divert a printed sheet to the scanner, the scanner being located such that the apparatus may continue to print and transport sheets to the output position during the scanning process.

By printing marks on print media and transporting the printed media offline (i.e. away from the media path along which print jobs are fed once printed) to a scanner arranged to scan the marks, a drop detection process may be achieved by comparing data relating to the scanned marks with data relating to marks printed by a correctly functioning system. However, various advantages may be realised.

Firstly, there is no requirement to move print head or other printing elements of the printer away from the position in which they are arranged to print, in order to undertake a drop detection procedure. Thus, the time taken to implement the procedure may be comparatively small compared to prior art systems, which in turn ensures that the impact on the throughput of the printer is reduced.

Secondly, by transferring the sheet upon which a drop detection pattern has been printed off-line, the scanning process may be carried out at a different rate or speed compared to the on-line process or processes. By "on-line process", it is meant any serial, or sequential, process that may be carried out in a printer workflow. This may include various treatments, for example lamination, being trimmed or edged etc. However, it may simply include the activity of feeding the printed output away from the print zone (i.e. to an output position) at approximately the same speed as the printing process is being carried out; thus, allowing the printing process to continue efficiently and possibly allowing the printed output to dry. This means that the scanning process, and thus the drop detection process, may be carried out to a higher standard than would be the case if it were carried out on-line. Alternatively, it means that the drop detection process may be carried out to a satisfactory standard using equipment and/or techniques that are less expensive or demanding than would otherwise be required.

Thus, in a preferred embodiment, where the throughput of the printer is high, for example using a page wide array of inkjet nozzles, a conventional optical CCD scanner may be used to carry out the drop detection process without adversely impacting on the throughput of the printer; i.e. the printer may continue to print and feed the printed output in a normal manner at a given speed while the test pattern is being scanned at a lower speed.

Advantageously, conventional CCD scanning elements, such as are used conventional in photocopying devices are available with a relatively wide field of view. This allows an entire test pattern to be scanned in a single scanning pass, thereby reducing the time and complexity of scanning the sheet. Furthermore, by using a CCD type scanner, drop detection results may be more accurate than have historically been obtained in printers belonging to the inkjet field, for example. CCD type scanners are capable of detecting small drops of ink on print media by virtue of their higher resolution capabilities, for example. Additionally, a large gamut of colours may be detected through the implementation of a red, green, blue (RGB) charge coupled device (CCD) contained in the optical scanners.

Preferably, the printer is adapted to use different types of media for drop detection routines and for printing print jobs printed by the user. By using less expensive print media for servicing operations, the cost of the drop detection routines in terms of the consumables used may be further reduced. In one preferred embodiment, this is implemented using two or more media specific input trays.

In a particular embodiment of the invention, by allowing sheets of print media upon which test patterns are printed to be diverted back to the print zone along a further media feed path, one or more further test patterns may be printed on the same sheet; for example on the reverse side. By reusing such sheets, the cost of such servicing routines, may be reduced in terms of the cost in consumables.

The present invention also extends to the corresponding method. Furthermore, the present invention also extends to a computer program arranged to implement the present invention in conjunction with suitable hardware.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example only the best mode contemplated by the inventors for carrying out the invention.

System of the Present Embodiment

Figure 1:
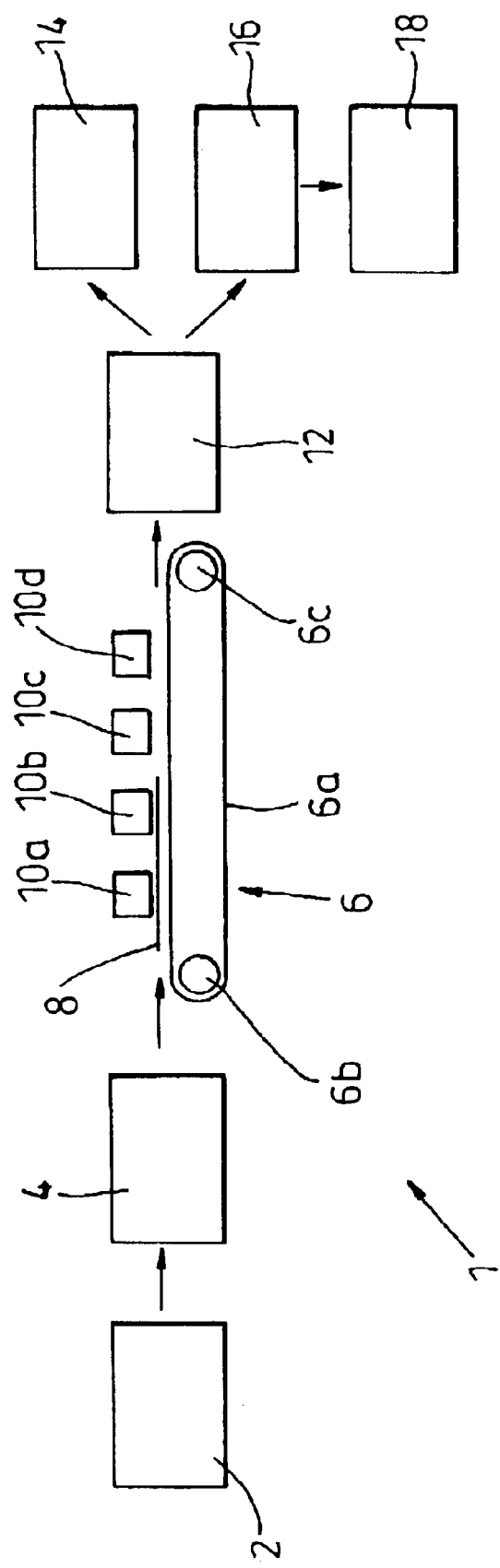
FIG. 1 illustrates schematically a printing device according to an embodiment of the present invention.

Referring to FIG. 1, a PWA printer device 1 according to the present embodiment is schematically illustrated.

The printer 1 has an input tray 2, which is used to store conventional sheets of new print media, usually in the form of a stack, before they are required for use. It may be opened and the print media replenished by the user when additional print media is required.

Adjacent to the input tray is a media handling device 4. The media handling device is arranged to pick a new sheet of print media from the stack of print media held in the input tray, when this is required, and to transfer the picked sheet to a transport path 6 so that the sheet may be printed on by the printer.

Both the input tray and the media handling device may be conventional in the field of printers and photocopiers. Such devices are well understood by those skilled in the art. Therefore, they will not be described further.

In the figure, the transport path 6 is schematically illustrated as a continuous belt 6a supported at either end on rollers 6b and 6c. However, the skilled reader will appreciate that any known, suitable sheet transport system may be used for this purpose. The media sheet 8 is located on the upper surface of the continuous belt by the media handling device and one or both of the rollers 6b, 6c are driven by an electric motor (not shown) in order to transport the media sheet in the direction of the arrows, towards a sheet diverter 12. The skilled reader will appreciate that various techniques are used with this type of known media transport path in order to ensure accurate transportation of the sheet. Such techniques are well know and understood in the art of printing, thus they will not be further descried here. However, amongst others, they include the use of electrostatic attraction, vacuum force, or mechanical devices in order to avoid the media sheet from slipping relative to the surface of the belt. Additionally, various types of optical sensor may be used in order to measure the position of the media sheet relative to the belt surface.

As the media sheet is transported along the transport path in the direction of the arrows, it passes under four stationary print bars 10a–d. As in understood in the art, a print bar is an array of ink jet nozzles extending across the width of the page is that is to be printed on. This array of ink jet nozzles may indeed be composed of a number of suitably arranged conventional ink jet print cartridges, or "pens". Thus, ink may be deposited across the entire printable width of the print media, without moving the printheads across the width of the print media. Print bars are known and well understood in the art and so they will not be described further. However, the reader is referred to European Patent 0 677 388 B1, in the name of Hewlett-Packard Co., which describes the structure of print bars for use in a PWA printing system, together with the associated print head data and control circuitry. European Patent 0 677 388 B1 is hereby incorporated by reference in its entirety.

One of the print bars, for example the print bar 10a, may be configured to eject black ink onto the recording medium. The print bars 10b–d may be configured to eject variously coloured inks, e.g., yellow, magenta and cyan inks, respectively. For the purposes of illustration, pens 10a–d are described as each containing dye-based inks, however, other inks, such as pigment-based inks may instead be used. Therefore, as the sheet passes under the four print bars the image to be printed is incrementally built up, colour by colour. Connected to each of the print bars is a conventional ink delivery system (not shown), which delivers the correct coloured ink from a reservoir via a system of ink deliver tubes to nozzles associated with the print bar.

Once the media sheet has passed by each of the four print bars, it is transferred from the transport path to a conventional diverter 12, which may direct the sheet in one of two directions. Such diverters are commonly used and well understood in the art of in printer and photocopier mechanisms paper handling mechanisms. In photocopiers, for example, they are used in duplexing and collating mechanisms. Therefore, the diverter will not be further described.

The diverter may direct a sheet, corresponding to a print job in the present embodiment, to a conventional output tray 14. The output tray 14 serves to store the printed output of the printer until it is collected by the user. The diverter may also direct a sheet, which in the present embodiment is being used in a drop detection process, along a different path to an optical scanner 16.

In the present embodiment, the scanner may be any conventional image capturing device. However, preferably a conventional CCD scanning element, such as is conventional used in photocopying devices is used. Such scanners function by illuminating an image with a focussed light source and sensing the reflected light with the CCD. The CCD may be configured to include various channels (e.g., red, green, and blue) to detect various colours using a single lamp or a one channel CCD (monochrome) with various colour sources (e.g., light emitting diodes (LED)). A more detailed description of the manner in which a CCD may operate to detect pixels of an image may be found in U.S. Pat. No. 6,037,584, assigned to Hewlett-Packard Co. The disclosure contained in that patent is hereby incorporated by reference in its entirety. This type of scanner has the advantage of being commercially available with a relatively wide field of view. This allows scanning of an entire sheet to be performed rapidly, in a single pass of the scanning device relative to the sheet. It also makes it possible to mount the scanner stationary in the printer device relative to the media transport path, thus giving rise to a simpler and more robust scanner implementation.

Once the printed sheet has passed by the scanner and been scanned, it is transported, again using conventional sheet handling technology, to a further output tray 18. This tray holds waste print media until the user throws it away.

Figure 2:
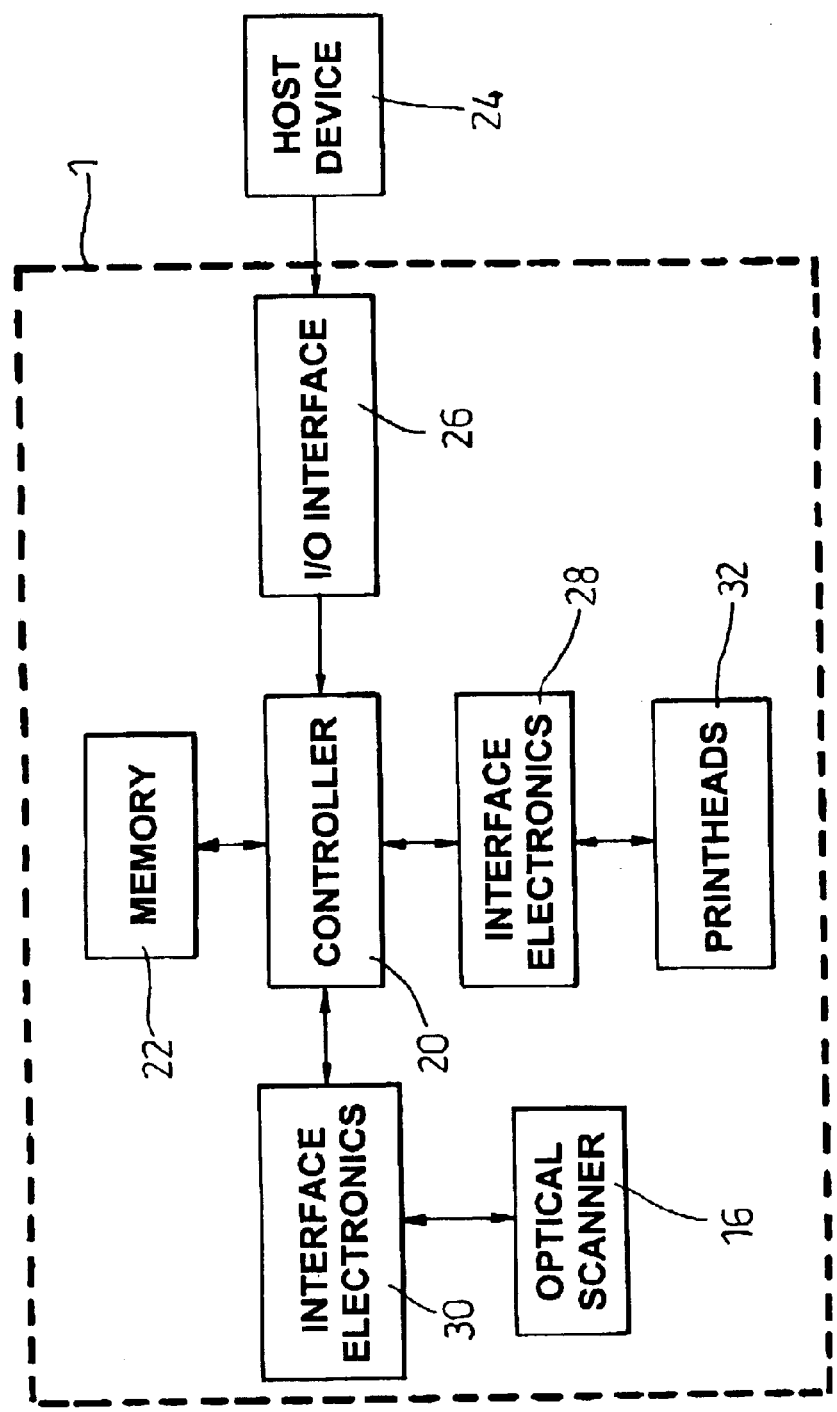
FIG. 2 is a schematic diagram illustrating subsystems of the printing device of FIG. 1.

The functions of the printer 1 of the present embodiment are controlled by a controller 20. FIG. 2 schematically illustrates the controller, together with the systems and subsystems that are most relevant to this description, with which it interacts.

The controller is arranged to read software code from a memory 22, that when executed by the controller, controls the functionality of the printer. The controller may be implemented using any suitable technology; for example: a microprocessor; a micro-controller; an application specific integrated circuit (ASIC), and the like.

The controller is arranged to communicate with an external host device 24, such as a computer, server, workstation and the like, via an input/output interface 26. In this manner, the controller may receive print instructions and data transmitted from the host device and may send return messages to the host device in a conventional manner. The I/O interface may conform to any suitable known protocol such as RS-232, parallel, small computer system interface, universal serial bus, etc.

The memory 22 may also be configured to provide a temporary storage area for data, such as print data, received by the printer from the host device, or indeed any data generated by systems of the printer. Preferably, therefore, the memory may be implemented as a combination of volatile and non-volatile memory, such as dynamic random access memory ("RAM"), as is well understood in the art.

The printer may also include conventional interface electronics 28 and 30, configured, respectively, to provide an interface between the controller and the printheads 32 of each print bar, and between the controller and the optical scanner 16. In addition to allowing controller to control the operation of the optical scanner, the optical scanner interface electronics may also operate to convert information sensed by the optical scanner into a format capable of being interpreted by the controller. The conversions of the instructions and the information may be accomplished by any reasonably suitable manner known to those skilled in the art.

Method of the Present Embodiment

The method of the present embodiment will now be described with reference to FIGS. 3a and 3b, which are flow diagrams illustrating the method of the present embodiment of the present invention.

Figure 3A:
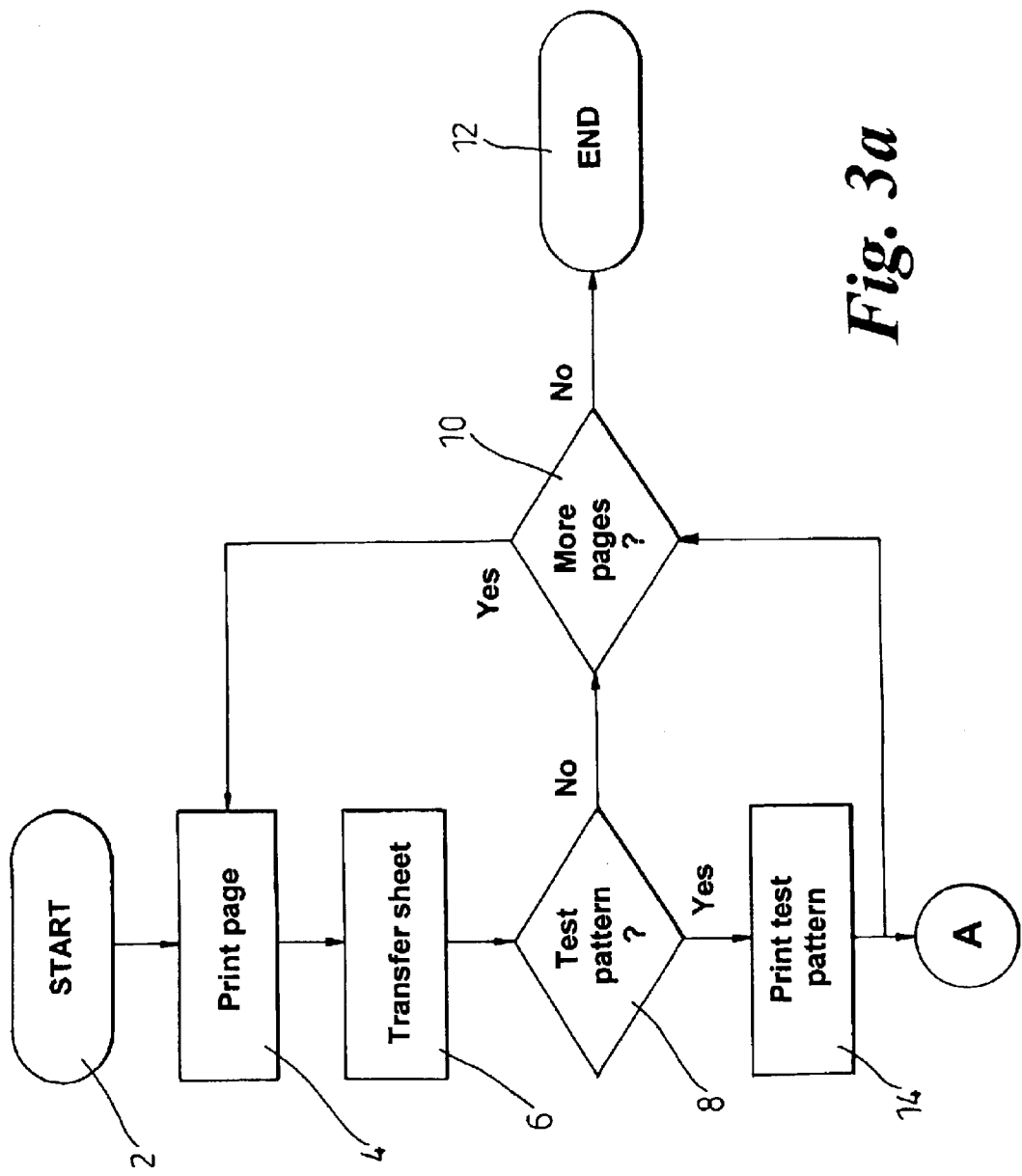
FIGS. 3a and 3b are flow diagrams illustrating the method of an embodiment of the present invention; and, FIG. 4 illustrates an exemplary test pattern printed according to an embodiment of the present invention.

At step 2 indicated in FIG. 3a, a printing operation is initiated by a user in a conventional manner. This causes the printer to carry out any data processing and preliminary configuration operations that may be required prior to commencing printing, as are customary in the art. Subsequently, at step 4, the printer prints the first page of the print job. This is carried out, with the paper handling device picking a sheet of print media from the input tray and transferring it to the transport path, where it receives ink from the print bars, as described above. Once the printing of the current page has been completed, it is transferred to the output tray, at step 6, by the diverter.

Subsequently, at step 8, the controller determines whether any of the nozzles in the print bars are required to undergo a drop detection process. This determination may be made using a number of conventional methods, which will be well understood by the skilled reader. For example, each print bar may be tested after a certain number of pages have been printed, or after a certain length of time has elapsed since the previous drop detection process. Alternatively, the use of each individually nozzle may be recorded by the controller. In this manner each nozzle may fall due for a drop detection process after a certain number of uses; i.e. after it has ejected a certain number of drops since its last drop detection process. Furthermore, if the recorded history of a given nozzle indicates that it is prone or not prone to require servicing, this information may be used to modify its servicing intervals. Additionally, drop tests may be carried out whenever any of the print bars are disturbed, e.g., just after being replaced.

If no drop detection is required at that moment, the controller determines at step 10 whether there are remaining pages of the print job to be printed. In the event that there are remaining pages of the print job to be printed, the process continues at step 4, where the next page of the print job is printed. This process (steps 4, 6, 8 and 10) continues until the controller determines either that a drop detection process should be implemented at step 8, or that no more pages of the print job remain to be printed, at step 10. In the latter case, the process ends at step 12. However, in the former case, a drop detection process is initiated for selected nozzles at step 14.

This process is initiated by a new sheet of print media being picked from the input tray and transferred to the transport path for printing on, in the same manner as described above with reference to the sheet upon which the first page of the print job was printed.

When the new sheet arrives at the correct position(s) on the transport path, the controller controls the selected nozzles to each eject one or more drops on the sheet of print media, thus forming a test pattern.

As will be described in more detail below, the test pattern is later scanned by the optical sensor in order to determine whether or not the selected nozzles are functioning correctly or not. Therefore, although the exact structure of the test pattern may vary, skilled reader will appreciate that the test pattern should preferably conform to various guidelines in order to aid the scanning process and in order to ensure that the drop detection process is implemented in an efficient manner. For example, the test pattern should be designed to facilitate the recognition of dots ejected by each nozzle under test. This may be achieved, for example, by ensuring that each nozzle under test should print sufficient dots, preferably tightly packed to form a dense line in the direction of media feed, such that the line can be reliably imaged by the optical scanner. Clearly the required dimensions of such a line will be determined by the characteristics of the optical scanner and therefore, this may be determined through experimentation. However, in many situations, lines of 5 to 10 mm should suffice.

Figure 4:
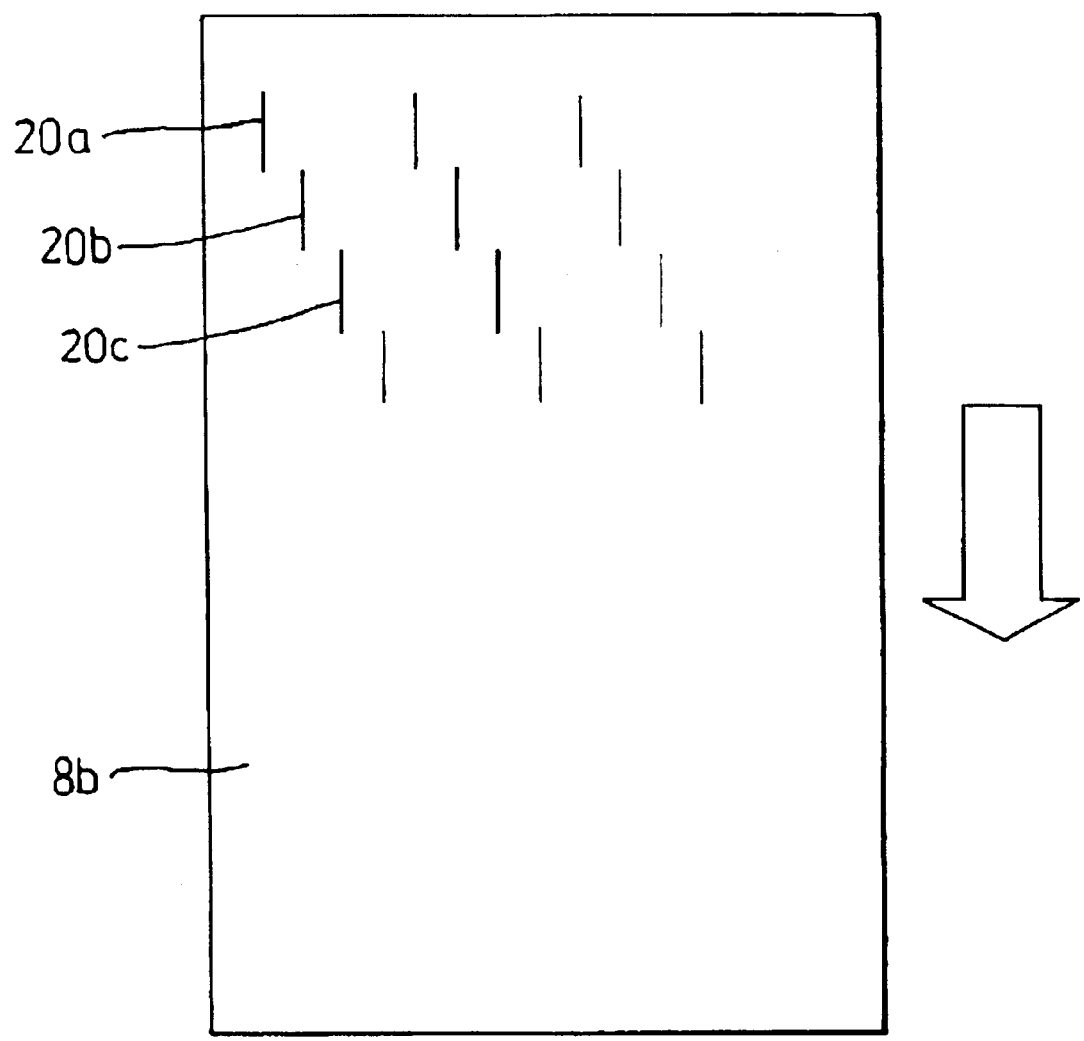

Additionally, it is generally desirable to be able to distinguish the dots or lines printed by one nozzle from those printed by another nozzle. In certain situations, drops ejected by a nozzle may become misdirected. Therefore in order to be able to attribute misdirected dots or lines to the correct nozzle it is preferable that closely positioned nozzles are controlled to print their test drops or lines spatially separated from those of their neighbours; for example, offset in the media feed direction. Part of such a test pattern is schematically illustrated, as it might be printed on the sheet of print medium 8b, in FIG. 4. As can be seen in the figure, each nozzle is controlled to print a line of dots 20. Furthermore, lines printed by neighbouring nozzles, for example lines 20a, 20b and 20c are spatially separated from each other in the media feed direction, which is illustrated by the arrow in the Figure.

In practice, the test pattern may be repeated using different nozzles over a substantial part, or all of the sheet 8b. This is indicated in the figure, by the lines printed in dotted line. Thus, the number of nozzles that may reliably be tested using a single sheet of print media will depend upon the chosen test pattern structure as well as the size of the sheet. However, on a given sheet some or all of the nozzles of one or more, or indeed all of the print bars may be tested.

Once the test pattern has been printed at step 14, the sheet is transferred, at step 17, by the diverter 12 along the transport path to the optical scanner 16 for scanning, as is described below with reference to FIG. 3b.

However, prior to the scanning of the test pattern, the controller may immediately continue the printing process by determining whether further pages of the print job remain to be printed, at step 10. If no more pages of the print job remain to be printed, the controller terminates the printing process at step 12. However, if further pages to be printed, the next of these pages is printed at step 4. Thus, the scanning of the test pattern does not reduce the throughput of the printer, which may continue to print the print job whilst the scanning process is carried out. In this manner, the throughput of the printer is reduced only by the time that it takes to print the test pattern. In contrast to prior art methods, there is no negative impact on the throughput of the printer caused by having to stop printing while the printheads are moved to a position, away from the print zone, where the drop detection process may be carried out.

Figure 3B:
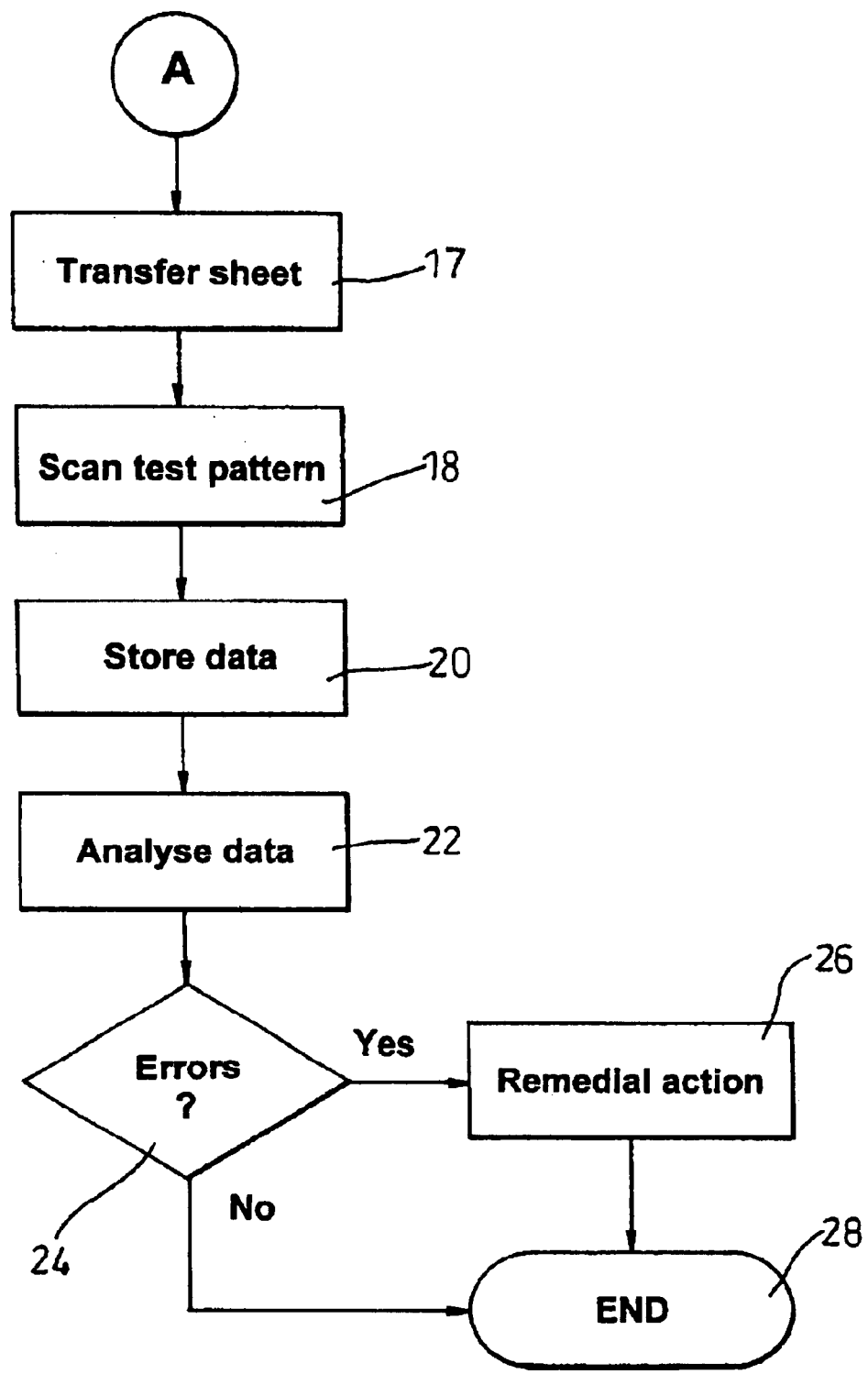

Turning now to step 18 of the method, illustrated in FIG. 3b, when the test pattern reaches the optical scanner, it is scanned in a conventional manner. The scanned image of the test pattern is then converted into electronic data, for example by the optical scanner interface electronics, which is indicative of the position of those lines or dots produced by the different nozzles on the sheet. This data is then transmitted to the controller, which in turn may save it in the memory, at step 20, for future analysis by the controller.

At step 22, the controller carries out an analysis of the scanned test pattern. Preferably, the analysis process is carried immediately after having saved the data. In this manner, the results of the analysis may be used, should this be required, to remedy any determined fault in the operation of the nozzles under test at the earliest opportunity. In the analysis, the scanned measurements of the placements of the dots or lines may be compared with their intended positions. The presence, position, size and shape of one or more dots, or a line of printed dots may be used to determine the correct functioning or otherwise, of each nozzle in a conventional manner known to the skilled person in the field. Thus, amongst other errors, drop placement errors, nozzle-outs, clogs and departures from nominal ink drop volumes may be determined.

At step 24, the controller determines whether the analysis process has determined that there are malfunctions, or errors in the functioning of any of the nozzles under test, which require remedial action. In the event that all of the nozzles under test are found to be functioning correctly, or to be functioning sufficiently well such that no immediate remedial action is required, the print job may continue to be printed in the normal manner. Thus, the controller ends the drop detection process at step 28 and continues to print the print job as described above with reference to FIG. 3a. If, on the other hand, one or more nozzles are found to be functioning incorrectly, or sufficiently badly that remedial action is required quickly, remedial action may be undertaken at step 26.

Any suitable type of remedial action may be undertaken to improve the performance of the defective nozzles, or to avoid any decrease in print quality due to their incorrect performance. Various such techniques are well known in the art. An example of such a technique is "error hiding". In cases where there is a nozzle redundancy built into the printer, those nozzles which have been identified as not functioning correctly may be deselected and so not used in a subsequent printing operation. Thus, the print mode, which is used to print the image, may be re-designed to avoid printing with those particular nozzles. Thus, the workload that would normally be undertaken by those nozzles is reassigned to other, or replacement nozzles. Preferably this process is carried out in real time. Examples of error hiding techniques suitable for use in combination with the present invention are disclosed in European Patent Applications 99103283.0 and 98301559.5, both in the name of Hewlett-Packard Co and which are hereby incorporated by reference in their entirety.

A range of techniques that may be used restore to good health one or more nozzles that are found to be functioning incorrectly, is collectively termed "printhead servicing". If the nozzles are not firing correctly, due to a blockage of dry ink, for example, a "spitting" routine, as is well understood in the art, may be implemented in an attempt to dislodge the dried ink and allow the nozzle to continue functioning correctly. This may either be carried out by spitting, i.e. purging, the printhead on a selected area of a page of the print job, as is described the in U.S. Pat. No. 5,659,342, assigned to Hewlett-Packard Co., which is hereby incorporated by reference in its entirety. Alternatively, it may be carried out on a separate sheet of print media, which will not form part of the printed output of the print job, which may be picked from the input tray as is described above. Once the "spitting" routine is completed the nozzle or nozzles concerned may be re-tested in accordance with the present invention, as is described above, to determine whether the servicing routine has been successful in correcting the malfunctioning of the nozzles concerned. Other further example of a remedial action that may be undertaken, and that is well understood in the art, is wiping the nozzle plate associated with selected nozzles usually with a suitable solvent. An example of a wiping mechanism is disclosed in the Hewlett-Packard Company's U.S. Pat. No. 5,614,930, which is hereby incorporated by reference in its entirety.

Whatever type of remedial action that is selected, the skilled reader will appreciate that depending upon the urgency of the remedial action, it may be carried out immediately, later during the print job, or after the print job has been completed. Once the remedial action is complete, the controller ends the drop detection process at step 28. However, the skilled reader will understand that the controller may be programmed to retest nozzles for which remedial action was required in order to determine whether or not that action was successful or not. Clearly, in the case that it is determined that it was not, further remedial action may be attempted.

Further Embodiments

In the embodiment described above, numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

For example, although the above embodiment is described with reference to a PWA printing system, the skilled reader will appreciate that the present invention may be used to advantage in other types of printer devices, such as scanning ink jet devices.

Furthermore, although in the above described embodiment, the methods starts with the printing of a normal page, the skilled reader will realize that in certain situations, it may be desirable to start the operation of the printer with a drop detection procedure. This may be useful after a protracted period of downtime, for example, when the nozzle health need to be checked prior to starting a print job.

Although in the above described embodiment, sheets upon which test patterns have been printed are only used once, the skilled reader will appreciate that this need not be the case. For example, a sheet that has had a test pattern printed on it may be rerouted back to the print zone after having been scanned using a conventional sheet feed mechanism. Thus, a further test pattern may be printed on the same sheet when such an operation is required. This may be either on the same side or on a different side of the sheet to the first test pattern.

Although four print bars are described in the above embodiment, the skilled reader will appreciate that this number may be varied. For example, further print bars may be added which print the same colour ink as that printed by one of print bars 10a–d, thus adding redundancy to the system. Alternatively, print bars may be added which print different coloured inks to those printed by the print bars 10a–d, to increase the colour gamut of the printer. Furthermore, one or more further print bars may be included to eject a fixer chemical to increase the speed of drying and wear characteristics of the printed image.

Furthermore, the skilled reader will appreciate that the printer may be configured, for example, to allow the sheets of inferior quality to be used for drop detection operations, through the provision of a separate media input tray. In this manner, consumable costs may be reduced. In this manner, the sheets selected for the printing of test patterns may be sized such that they no bigger than required in order to have the test pattern printed on them. Thus, the impact of printing a test patter on the throughput of the printer may be reduced.

In the example of the present embodiment, for ease of explanation, the determination made by the controller at step 8, as to whether or not a test pattern should be printed, is illustrated as being made subsequent to the printing of a page at step 4 and the transfer step of step 8. However, in practice, this determination may be made by the controller during or even well before the printing and the transfer steps of steps 4 and 8. One reason for this is that a PWA system may have a forward media path 6 that is very long in relation to the sheets of print media that it transports. Thus, during normal operation it may, at any given moment, be transporting a number of sheets, arranged end to end, towards the print bars. Therefore, if a test pattern is to be printed in a selected sheet (possibly of inferior quality and/or reduced size), which is to be located under a given print bar at a required time, the controller must cause that selected sheet to be picked, sufficiently in advance of the required time to allow this to happen.

What is claimed:

1. A printer apparatus comprising one or more printing elements arranged to print on print media in a printzone and a transport path arranged to transport printed sheets from the printzone to an output position, the apparatus further comprising a scanner arranged to scan a printed sheet, and a diverter arranged to selectively divert a printed sheet to the scanner, the scanner being located such that the apparatus may continue to print and transport sheets to the output position during the scanning process.

2. An apparatus according to claim 1, wherein the diverter means is arranged to divert a selected sheet from the transport path.

3. An apparatus according to claim 1, wherein the printer is arranged to print a test pattern on the selected sheet prior to it being scanned.

4. An apparatus according to claim 3, further comprising processing means adapted to analyze data corresponding to the scanned test pattern.

5. An apparatus according to claim 4, further adapted to implement an error hiding technique in dependence upon the analysis of the data.

6. An apparatus according to claim 5, wherein the printer is an inkjet printer.

7. An apparatus according to claim 4, further adapted to implement a printing element servicing routine in dependence upon the analysis of the data.

8. An apparatus according to claim 7, wherein the printing element servicing routine comprises spitting with one or more inkjet nozzles.

9. An apparatus according to claim 8, wherein the one or more printing elements form at least part of a page wide array of inkjet nozzles.

10. An apparatus according to claim 3, arranged to print on first and second types of print media and to select the first type for printing print jobs and the second type for printing test patterns.

11. An apparatus according to claim 10, wherein the first and second types of print media have substantially different technical specifications and/or dimensions.

12. An apparatus according to claim 1, wherein the scanner device comprises a CCD element.

13. An apparatus according to claim 12, wherein the scanner device is fixedly mounted relative to the printer apparatus, the printer comprising a feed path arranged feed the selected sheet to or past the scanner such that it may be scanned.

14. An apparatus according to claim 1, comprising a further feed path arranged to feed the scanned sheet to a second output position.

15. An apparatus according to claim 14, comprising a second further feed path, arranged transport the scanned sheets back to the print zone such that a further pattern or image may be printed on the sheet.

16. A printer apparatus comprising one or more printing elements arranged to print on print media located in a print position, the apparatus further comprising first and second media paths respectively adapted to feed media to and away from the print position, the apparatus being arranged to selectively divert a print media sheet from the second media path to a scanning position, the apparatus being arranged to scan the diverted sheet while printing.

17. A method of monitoring the operation of a printer, the printer comprising a printzone and a first media feed path arranged to transport printed print media from the printzone to an output position, the method comprising:

printing on a sheet of print media;

feeding the sheet to an off-line location along a second media feed path; and, scanning the sheet in the off-line location.

18. A method according to claim 17, wherein the scanning the sheet is carried out whilst the printer prints a print job and print media corresponding to the printed output of the print job is transported to the output position.

19. A method according to claim 17, wherein the printing comprises printing a test print with one or more printing elements.

20. A method according to claim 19, wherein the test comprises an array of marks printed by the one or more printing elements, the marks of each of the one or more printing elements being mutually spatially separated such as to make the marks individually attributable to the respective one or more printing elements.

21. A method according to claim 19, wherein the printer is an inkjet printer.

22. A method according to claim 21, wherein the servicing routine comprises a spitting operation or nozzle wiping operation.

23. A method according to claim 19, further comprising printing a print job on a first print media type, and printing the test print on a second media type, the first and second types having substantially differing dimensions and/or technical specifications.

24. A method according to claim 19, further comprising implementing a test print operation for a printing element in dependence upon the period of time that has elapsed since it was last used, the time since it last underwent a servicing routine, its recorded performance and servicing history, or the throughput of the printer, or a combination of these factors.

25. A method according to claim 17, further comprising analysing results of the scanning.

26. A method according to claim 25, wherein the scanned position, shape or size of one or more of the marks of the test are compared with the intended or expected position, shape or size, the results of the comparison being used to determine whether or not the respective one or more printing elements is functioning within prescribed limits.

27. A method according to claim 26, further comprising implementing remedial action if it is determined that the one or more of the one or more printing elements is not functioning within prescribed limits.

28. A method according to claim 27, wherein the remedial action comprises an error hiding process.

29. A method according to claim 27, wherein the remedial action comprises implementing a servicing operation upon one or more printing elements determined not to be functioning within prescribed limits.

30. A method according to claim 17, further comprising diverting the scanned sheet back to the print area; and, repeating printing on the scanned sheet.

31. A method according to claim 30, wherein repeated and previous printing are carried out on a substantially different parts of the scanned sheet.

32. A method according to claim 17, comprising the further step of feeding the scanned sheet to a further output position.

33. A method according to claim 17, wherein the printer is a page wide array printer.

34. A method of operating a printer apparatus comprising a transport path adapted to transport printed sheets from a printing position to an output position, the apparatus further comprising a diverter arranged to divert a printed sheet from said transport path to an off-line optical scanner arranged to scan the printed sheet, the method comprising:

diverting a selected printed sheet from the transport path to the optical scanner; and, scanning the printed sheet while continuing to print one or more further sheets and to transport those sheets to the output position.

35. A computer program comprising program code means for performing the method claim 17 when the program is run on a computer and/or other processing means associated with suitable hardware.

36. A computer program comprising program code means for performing the method claim 34 when the program is run on a computer and/or other processing means associated with suitable hardware.

* * * * *